June 30, 1964  W. L. STEEN  3,139,214
CONVEYOR FOR LOW TEMPERATURE OPERATION
Filed May 1, 1961  3 Sheets-Sheet 1

INVENTOR.
Wilbur L. Steen
BY
ATTORNEY.

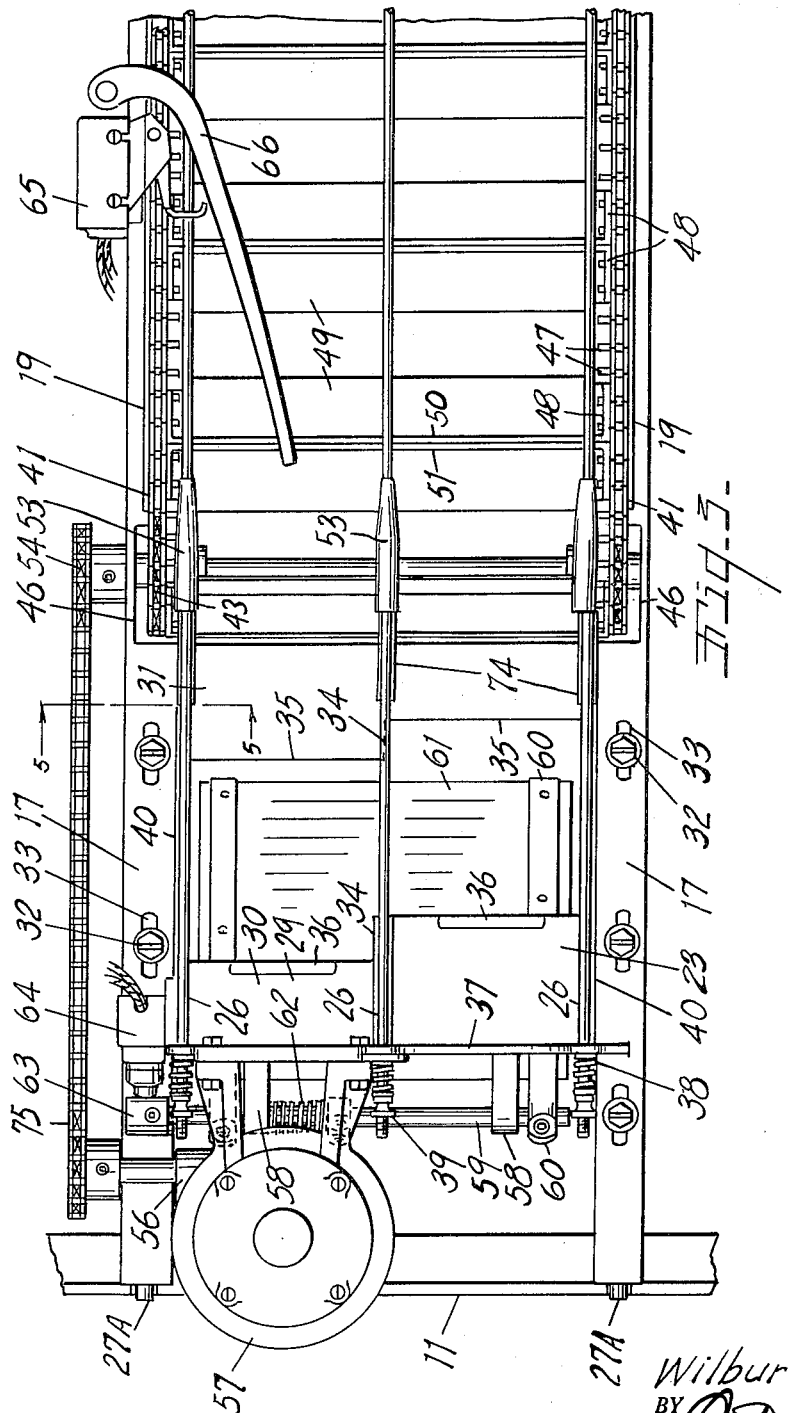

June 30, 1964 W. L. STEEN 3,139,214
CONVEYOR FOR LOW TEMPERATURE OPERATION
Filed May 1, 1961 3 Sheets-Sheet 3
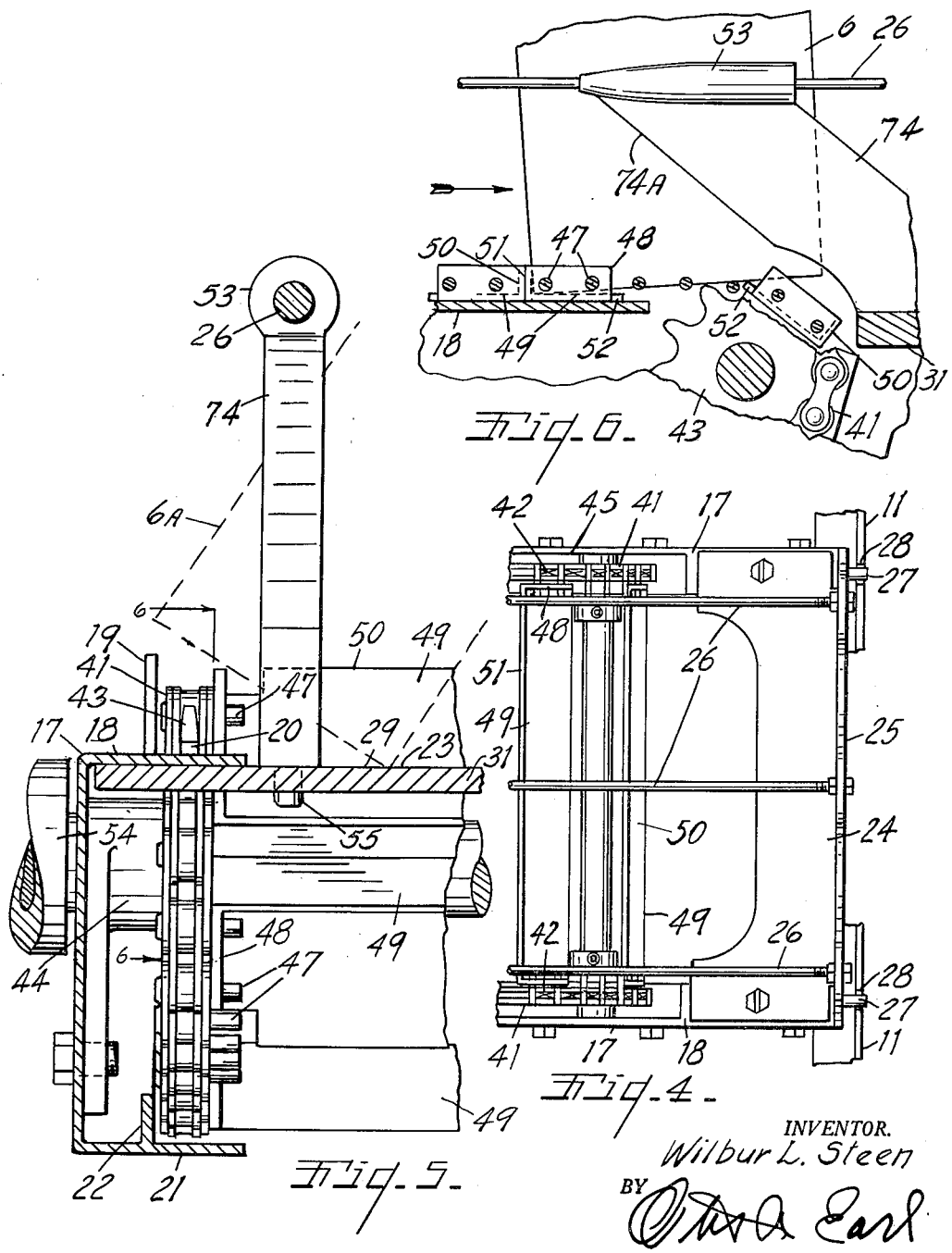
INVENTOR.
Wilbur L. Steen
BY
ATTORNEY.

United States Patent Office 3,139,214
Patented June 30, 1964

3,139,214
CONVEYOR FOR LOW TEMPERATURE
OPERATION
Wilbur L. Steen, 344 Commerce Ave. SW.,
Grand Rapids, Mich.
Filed May 1, 1961, Ser. No. 106,655
19 Claims. (Cl. 221—77)

This invention relates to improvements in conveyor for low temperature operation. The principal objects of the invention are:

First, to provide a conveyor for ice cream packages and other frozen foods that will operate in a freezing cabinet to advance and discharge the packages without jamming due to freezing of the packages to the contacting parts of the conveyor.

Second, to provide a conveyor way, flights and driving chain that will elevate each flight relative to the way just prior to discharge of packages from the conveyor to break any frozen connection between the packages and the way and the flights.

Third, to provide a conveyor having ways and flights with side guide rails positioned above the flights and having laterally enlarged camming surfaces to cam packages sideways on the flights and to coact with tilting action of the flights to break packages frozen to the flights loose from the flights.

Fourth, to provide a unitary conveyor assembly that can be easily removed from a low temperature cabinet for service and repair.

Fifth, to provide a conveyor adapted to operate without attention as part of a coin operated package delivery system operating at below freezing temperatures.

Other objects and advantages of the invention will be apparent from a consideration of the following description and claims, the drawings of which there are three sheets, illustrate a highly practical form of the invention.

FIG. 3 is a top plan view of the delivery end of the conveyor.

FIG. 4 is a top plan view of the rear end of the conveyor.

FIG. 5 is a fragmentary vertical cross sectional view taken along the plane of the line 5—5 in FIG. 3 looking in the direction of the arrows.

FIG. 6 is an enlarged fragmentary vertical cross sectional view taken along the plane of the line 6—6 in FIG. 5 and illustrating the action of the conveyor in breaking frozen packages loose from the conveyor parts.

Figure 1:
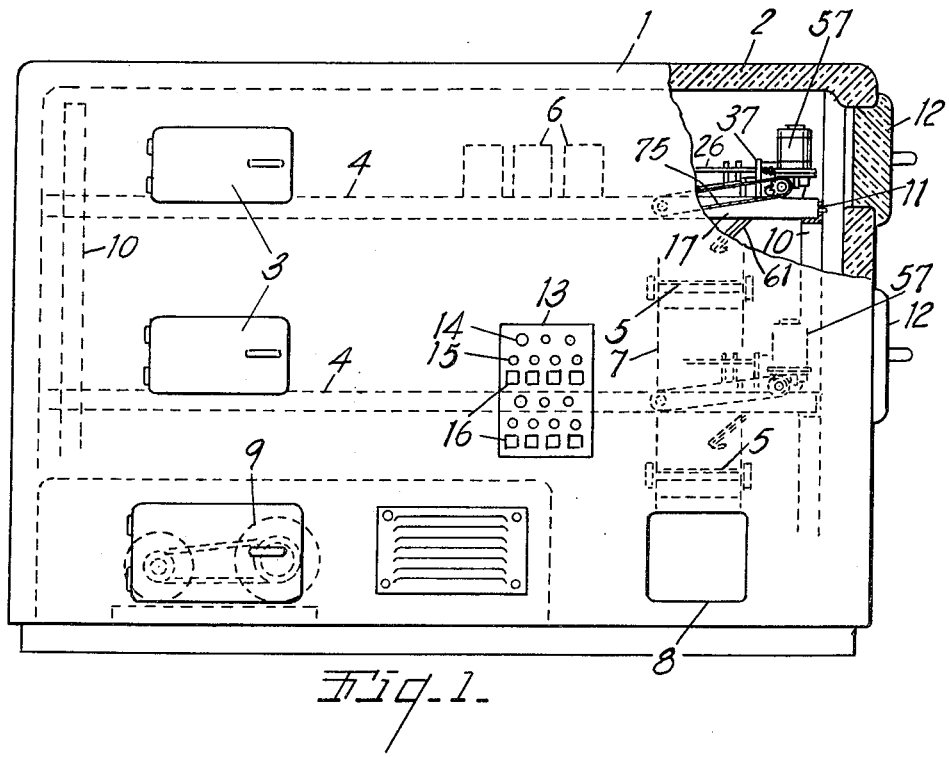
FIG. 1 is an elevational view partially broken away illustrating one possible form of installation of the conveyor of the invention.

As is indicated in the objects, the conveyor of the invention is designed for use as part of a coin operated dispensing device arranged to operate at low temperatures for dispensing ice cream packages and the like without the services of an attendant. FIG. 1 illustrates one possible assembly of the conveyor in a dispensing device but it will be understood that other arrangements of the conveyor in a low temperature cabinet are possible. 1 indicates a cabinet having insulating walls 2 with charging doors 3 in the front thereof. Two conveyors of the type to be described are mounted in the cabinet as at 4 and it will be appreciated that the number of conveyors can be multiplied both horizontally and vertically depending on the size of the cabinet. Cross conveyors 5 receive package 6 from the conveyors 4 and deliver them to a chute 7 delivering to a delivery opening 8. Refrigerating apparatus 9 is housed in a chamber in the bottom of the cabinet.

Mounted within the cabinet 1 is a supporting framework having uprights 10 and horizontal side rails 11 of angled section. The side rails 11 removably support the conveyors as will be more particularly described. Since refrigerated space will be at a premium and since it will be difficult to work on metal parts that are chilled well below freezing, service doors 12 are provided in the side walls through which each conveyor 4 may be removed for service.

13 indicates conventionally a coin operated control panel having coin receiving apertures 14, item selector buttons 15 and item name plates 16. The details of the operating circuits which make the device a fully automatic dispensing apparatus are not claimed herein and so are not illustrated in greater detail. It will be understood that the customer inserts coins to the correct value and operates the selected button 15 after which a system of limit and cam operated switches cause the conveyors to operate to deliver a package of the selected product to the chute 7 and opening 8.

Turning to the construction of the conveyors 4 which are identical, it is pointed out that they are made up of side bars 17 that are desirably of extruded aluminum having a channel shaped cross section shown in FIG. 5. The upper flange or rail 18 has an upstanding side guide 19 and a chain supporting rail 20 formed thereon which the lower flange or rail 21 has an upstanding chain guide rail 22 formed thereon. The side rails 17 are connected by a cross head 23 at the delivery end of the conveyors and by a cross bar 24 at the rear or infeeding end. The cross bar 24 appearing in FIG. 4 is bolted to the top flanges 18 and has an upstanding end wall 25 to which the ends of side guide rods 26 are bolted in spaced relation above the conveyor. The rear ends of the side rails 17 carry pins 27 received in notches 28 in the flange of the side support rail 11. The outer ends of the side rails are similarly located on support rails 11 by pins 27A.

Figure 2:
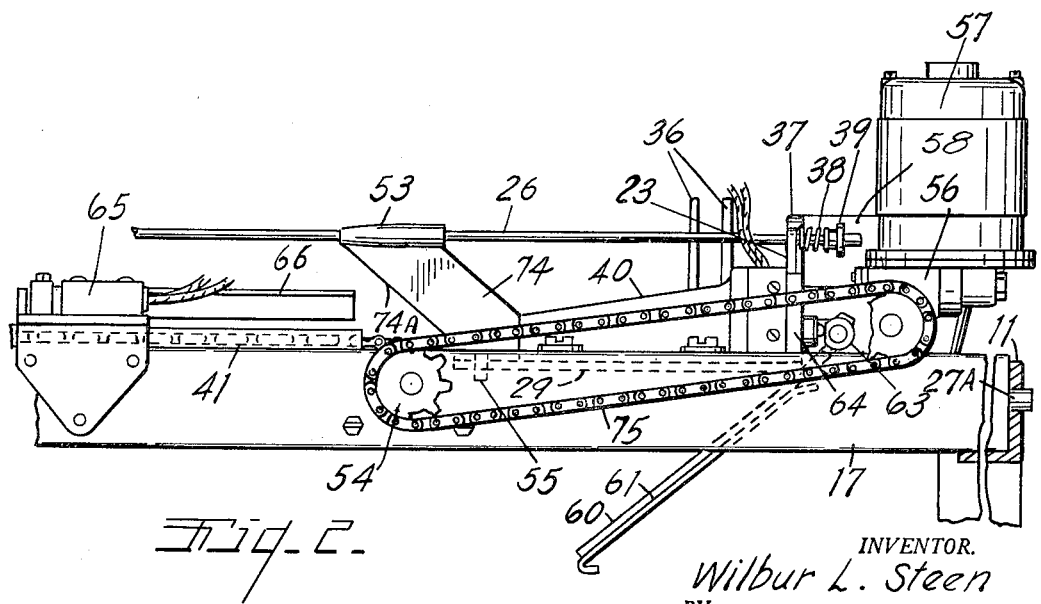
FIG. 2 is an enlarged fragmentary side elevational view of the delivery end of the conveyor in installed operative position.

The cross head 23 at the delivery end of the conveyor appears most clearly in FIGS. 2, 3 and 5 and is preferably formed as an aluminum casting. The base of the head 23 is a plate 29 that has an outer cross portion 30 and an inner cross portion 31 extending between and bolted to the undersides of the top flanges 18 of the side rails by bolts 32. The bolts 32 extend through slots 33 to permit adjustment of the cross head on the side rails.

The cross portions 30 and 31 are spaced longitudinally of the conveyor and as appears most clearly in FIG. 3 their opposed edges are staggered as at 34 to form longitudinally offset discharge throats 35 between the side rails 17 and the guide rods 26. The outer cross portion 30 has upstanding stops 36 at the outer edges of the throats and an upstanding end wall 37 through which the outer ends of the side guide rods are passed. Springs 38 on the outer ends of the guide rods are compressed by nuts 39 to permit variation of the length of the side rails 17 and guide rods 26 as the temperature of the parts varies. Upstanding tapering flanges 40 connect the outer and inner cross portions at the sides of the head 23 and form the laterally outer sides of the throats 35. While two throats 35 and associated conveyor ways between the guide rods 26 are illustrated, it will be appreciated that more or less throats or ways could be provided.

The conveyor that moves the package 6 along the ways consists of a pair of looped chains 41 trained over idler sprockets 42 at the inner end of the conveyor and drive sprockets 43 positioned toward the outer end of the conveyor just inwardly from the inner cross portion 31 and the throats 35. The sprockets are mounted on suitable cross shafts journaled in bearings 44 bolted within the channel sections of the side rails 17. The top flanges 18 of the side rails are notched as at 45 to permit the tops of the idler pulley to project above the side rails and as at 46 to permit the tops of the drive pulley to project above the side rails. The upper reaches of the chain loops thus slide along the top flanges 18 while the lower flanges support the lower return reaches of the chains. The chains 41 are of the flat link and pin type and the outer ends of the pins 47 are guided by the guide rails 19 and 22 while the centers of the pins ride along the support rails 20.

Adjacent pins 47 project laterally inwardly and engage end flanges 48 on flight plates 49 along spaced lines that extend transversely between the chains. The flight plates 49 are arranged in pairs with spaces therebetween depending on the size of the packages to be dispensed (see FIG. 6). The leading edge of the leading flight plate has an upturned flange 50 therealong and the trailing edge of the trailing flight plate of each pair of plates has an upturned pusher flange 51 formed therealong. With particular attention to FIG. 6 it will be noted that the trailing edge of the leading flight plate projects substantially rearwardly from the line between the rearmost chain pins 47 connected to the flight plate. This trailing edge is therefore tilted substantially upwardly and above the level of the following flight plate as at 52 as the leading flight plate of each pair travels around the drive pulleys. This raises and tilts the package 6 and serves to break any frozen or frosted connection that may have formed between the flight plates and the package while the conveyor has been idle.

Coacting with the frost breaking action of the leading flight plates is the action of lateral displacing cams 53. The cams 53 are rearwardly or inwardly tapering tubular elements through which the laterally outer and interior guide rods are passed. The cams have rearwardly and downwardly inclined posts 74 that rest on the inner cross plate 31 of the cross head and are held against movement with respect thereto by pins 55 that are received in holes in the cross plate. The cams 53 are located in the vertical plane through the drive sprockets 43 so that as the leading flight plate 49 of each pair tilts upwardly to apply a vertical breaking force to any frozen connection, the cam 53 simultaneously applies a lateral moving and breaking force to any package not centered in its flight pocket. Should any package be cocked or tilted as by being improperly loaded on the conveyor as indicated by the dotted lines at 6A in FIG. 5 the rearwardly and downwardly inclined lower edge 74A of the arms 74 will cammingly depress the mis-alined package for proper delivery through the throat 35.

The chains 41 of the conveyor are driven by a sprocket 54 on the laterally outer end of the drive shaft. A chain 75 extends rearwardly to a shaft projecting from a gear box 56 on a motor 57. The motor 57 is bolted to the outer face of the upstanding flange 37 on the cross head 23.

The flange 37 also has outwardly projecting bearing bosses 58 that support the rock shaft 59. The shaft 59 carries gate arms 60 that support a plate-like gate 61 in inclined swingable position below the delivery throats 35. A spring 62 (see FIG. 3) biases the gate forwardly to closed position below the throats. A cam 63 on the end of the shaft 59 operates a limit switch 64 in the control circuit of the dispensing device to indicate when a package has been delivered through the throat. A second limit switch 65 may be mounted on one of the side rails 17 and provided with an operating arm 66 projecting over the conveyor way to indicate the presence of a package ready to be delivered.

In operation of the conveyor, the leading package 6 is first tilted rearwardly as shown in FIG. 6 to break any frost connection and then tilts forwardly to fall against the stop 36 associated with its way. The bottom of the package is then pushed over the inner cross portion 31 into the throat 35 from where it falls onto the gate 61 to actuate the limit switch 64 that can be connected to stop the motor 57. Should the conveyor need servicing access can be had to its inner and outer ends through the doors 3 and 12 to lift the side bars 17 off the support bars 11 and slide the whole conveyor out of the service door 12.

Having thus described the invention, what is claimed as new and is desired to be secured by Letters Patent is:

1. Dispensing apparatus for frozen food packages comprising a refrigerated cabinet having a supporting framework with horizontal side rails therein, a plurality of conveyor assemblies disposed in spaced parallel relation in said cabinet and having side bars freely supported and laterally retained on said side rails, each assembly including side bars of opposed channel shaped cross section connected at the inner end of the assembly by a cross bar and connected at the outer end by a cross head, said cross bar and cross head having upstanding flanges with guide rods supported therebetween above the plane of said side bars, a cross plate forming a part of said cross head and secured to the undersides of the top flanges of said side bars and defining a discharge throat with longitudinally offset portions between said guide rods, drive sprockets mounted on said side bars inwardly of said cross plate and projecting upwardly through notches in the upper flanges of said side bars, idler sprockets mounted on the inner ends of said side bars and projecting upwardly through notches provided therefor in the upper flanges of said side bars, pin and link belt chains trained over said sprockets with their upper reaches supported on said upper flanges, said upper flanges having integral guide and support rails formed thereon and engaging the outer ends and centers of the pins of said chains, adjacent pairs of pins in said chains projecting inwardly therefrom, flight plates arranged in opposed pairs and having end flanges receiving a pair of said pairs of pins, the leading edge of the leading plate and the trailing edge of the trailing plate of each pair of plates having an upstanding flange thereon, the trailing edge of the leading plates extending a substantial distance rearwardly from the rearmost pins of the chains connected to the plate whereby said trailing edges will be tilted substantially above the level of said top flanges in rotating about said drive sprockets, inclined arms supported from the inner side of said cross plate and inclined rearwardly of said conveyor, laterally and rearwardly tapering cams on the upper ends of said arms sleeved around the side guide rods above said drive sprockets to cam packages laterally inwardly as they are tilted by the trailing edges of said leading flight plates, a motor mounted on the flange of said cross head on said conveyor and connected to rotate said sprockets, a gate pivoted on said cross head and extending under said throat to be actuated by packages discharged through said throat, a switch positioned to be actuated by said gate and connected to stop said motor, service doors in one wall of said cabinet opposite the discharge ends of said conveyor assemblies, charging doors in another wall of said cabinet opposite the rear ends of said assemblies, and other conveyor means arranged to receive packages discharged through said throats and deliver the packages to a delivery opening in said cabinet.

2. Dispensing apparatus for frozen food packages comprising a refrigerated cabinet having a supporting framework with horizontal side rails therein, a plurality of conveyor assemblies disposed in spaced parallel relation in said cabinet and having side bars freely supported and laterally retained on said side rails, each assembly including side bars of opposed channel shaped cross section connected at the inner end of the assembly by a cross bar and connected at the outer end by a cross head, said cross bar and cross head having upstanding flanges with guide rods supported therebetween above the plane of said side bars, a cross plate forming a part of said cross head and secured to the top flanges of said side bars and defining a discharge throat between said guide rods, drive sprockets mounted on said side bars inwardly of said cross plate and projecting upwardly through notches in the upper flanges of said side bars, idler sprockets mounted on the inner ends of said side bars and projecting upwardly through notches provided therefor in the upper flanges of said side bars, pin and link belt chains trained over said sprockets with their upper reaches supported on said upper flanges, adjacent pairs of pins in said chains projecting inwardly therefrom, flight plates arranged in opposed pairs and having end flanges receiving a pair of said pairs of pins, the trailing edge of the trailing plate of each pair of plates having an upstanding flange thereon, the trailing edge of the leading plates extending a substantial distance rearwardly from the rearmost pins of the chains connected to the plate whereby said trailing edges will be tilted substantially above the level of said top flanges in rotating about said drive sprockets, inclined arms supported from the inner side of said cross plate and inclined rearwardly of said conveyor, laterally and rearwardly tapering cams on the upper ends of said arms sleeved around the side guide rods above said drive sprockets to cam packages laterally inwardly as they are tilted by the trailing edges of said leading flight plates, a motor mounted on said conveyor and connected to rotate said sprockets, a gate pivoted on said cross head and extending under said throat to be actuated by packages discharged through said throat, a switch positioned to be actuated by said gate and connected to stop said motor, service doors in one wall of said cabinet opposite the ends of said conveyor assemblies, charging doors in another wall of said cabinet opposite the rear ends of said assemblies, and other conveyor means arranged to receive packages discharged through said throats and deliver the packages to a delivery opening in said cabinet.

3. Dispensing apparatus for frozen food packages comprising a refrigerated cabinet having horizontal side rails therein, a plurality of conveyor assemblies disposed in spaced parallel relation in said cabinet and having side bars freely supported and laterally retained on said side rails, each assembly including side bars connected at the inner end of the assembly by a cross bar and connected at the outer end by a cross head, said cross bar and cross head having upstanding flanges with guide rods supported therebetween above the plane of said side bars, a cross plate forming a part of said cross head and defining a discharge throat with longitudinally offset portions between said guide rods, sprockets mounted on said side bars inwardly of said cross plate and projecting upwardly above said side bars, other sprockets mounted on the inner ends of said side bars and projecting upwardly above said side bars, pin and link chains trained over said sprockets with their upper reaches supported on said side bars, said side bars having guide rails thereon and engaging the pins of said chains, adjacent pairs of pins in said chains projecting inwardly therefrom, flight plates arranged in opposed pairs and having end flanges receiving a pair of said pairs of pins, the trailing edge of the trailing plate of each pair of plates having an upstanding flange thereon, the trailing edge of the leading plates extending a substantial distance rearwardly from the rearmost pins of the chains connected to the plate whereby said trailing edges will be tilted substantially above the level of said side bars in rotating about the sprockets at the discharge end of the conveyor, inclined arms supported from the inner side of said cross plate and inclined rearwardly of said conveyor, laterally and rearwardly tapering cams on the upper ends of said arms sleeved around the side guide rods above said drive sprockets to cam packages laterally inwardly as they are tilted by the trailing edges of said leading flight plates, a motor mounted on said conveyor and connected to rotate said sprockets, service doors in one wall of said cabinet opposite the discharge ends of said conveyor assemblies, charging doors in another wall of said cabinet opposite the sides of the rear ends of said assemblies, and other conveyor means arranged to receive packages discharged through said throats and deliver the packages to a delivery opening in said cabinet.

4. Dispensing apparatus for frozen food packages comprising a refrigerated cabinet having horizontal side rails therein, a plurality of conveyor assemblies disposed in spaced parallel relation in said cabinet and having side bars supported on said side rails, each assembly including side bars of opposed channel shaped cross section connected at the inner end of the assembly by a cross bar and connected at the outer end by a cross head, guide rods supported above the plane of said side bars, a cross plate forming a part of said cross head and secured to the top flanges of said side bars and defining a discharge throat with longitudinally offset portions between said guide rods, sprockets mounted on said side bars inwardly of said cross plate and projecting upwardly above the upper flanges of said side bars, other sprockets mounted on the inner ends of said side bars and projecting upwardly above the upper flanges of said side bars, pin and link chains trained over said sprockets with their upper reaches supported on said upper flanges, adjacent pairs of pins in said chains projecting inwardly therefrom, flight plates arranged in opposed pairs and having end flanges receiving a pair of said pairs of pins, the trailing edge of the trailing plate of each pair of plates having an upstanding flange thereon, the trailing edge of the leading plates extending a substantial distance rearwardly from the rearmost pins of the chains connected to the plate whereby said trailing edges will be tilted substantially above the level of said top flanges in rotating about said first sprockets, arms supported from said side bars, laterally and rearwardly tapering cams on the upper ends of said arms sleeved around the side guide rods and extending above said first sprockets to cam packages laterally inwardly as they are tilted by the trailing edges of said leading flight plates, a motor mounted on said conveyor and connected to rotate said sprockets, service doors in one wall of said cabinet opposite the discharge ends of said conveyor assemblies, and charging doors in another wall of said cabinet opposite the sides of the rear ends of said assemblies.

5. Dispensing apparatus for frozen food packages comprising a refrigerated cabinet, a conveyor assembly disposed in said cabinet and having side bars of opposed channel shaped cross section connected at the inner end of the assembly by a cross bar and connected at the outer end by a cross head, said cross bar and cross head having upstanding flanges with guide rods supported therebetween above the plane of said side bars, a cross plate forming a part of said cross head and secured to the top flanges of said side bars and defining a discharge throat between said guide rods, sprockets mounted on said side bars inwardly of said cross plate and projecting upwardly through notches in the upper flanges of said side bars, other sprockets mounted on the inner ends of said side bars and projecting upwardly through notches provided therefor in the upper flanges of said side bars, pin and link chains trained over said sprockets with their upper reaches supported on said upper flanges, adjacent pairs of pins in said chains projecting inwardly therefrom, flight plates arranged in opposed pairs and having end flanges receiving a pair of said pairs of pins, the trailing edge of the trailing plate of each pair of plates having an upstanding flange thereon, the trailing edge of the leading plates extending a substantial distance rearwardly from the rearmost pins of the chains connected to the plate whereby said trailing edges will be tilted substantially above the level of said top flanges in rotating about said drive sprockets, arms supported from the innerside of said cross plate, laterally and rearwardly tapering cams on the upper ends of said arms sleeved around the side guide rods above said first sprockets to cam packages laterally inwardly as they are tilted by the trailing edges of said leading flight plates, means connected to rotate said sprockets, a service door in one wall of said cabinet opposite the end of said conveyor assembly, and a charging door in another wall of said cabinet opposite the side of the rear end of said assembly.

6. A conveyor for low temperature operation comprising a pair of extruded aluminum side bars of opposed channel section with integral guide rails on their upper and lower flanges, a cross bar connecting the rear ends of said side bars and having a flange projecting above said top flanges, a cross head connecting the front ends of said side bars and including a cross plate bolted to the undersides of the top flanges of said side bars, an end flange on the outer edge of said cross head projecting above said top flanges, a plurality of guide rods supported between said flanges on said cross bar and said cross head in spaced relation above said top flanges of said side bars, said cross plate defining longitudinally offset discharge throats at the discharge end of the conveyor, rearwardly converging tapered cams on the side guide rods located rearwardly of said cross plate, arms bracing said cams from said cross plate, a first pair of sprockets mounted on said side bars and projecting upwardly through slots provided therefor in the top flanges of said side bars, said sprockets being located under said cams, other sprockets mounted at the rear ends of said side bars and projecting upwardly through slots provided therefor in the top flanges of said side bars, loop chains of link and pin construction trained over the sprockets on each side bar with the pins guidingly engaged with said guide rails, pairs of flight plates extending between said chains with each plate connected to two adjacent pins on each chain, the trailing edge of the leading flight plate of each pair projecting substantially rearwardly behind the rearmost chain pins connected to the plate whereby the rear edge is tilted upwardly above the level of the trailing plate of the pair in rotating around said first sprockets under said cams, the trailing edges of the trailing flight plates having pusher flanges thereon, and a motor mounted on the crosshead on said side bars and connected to rotate said sprockets.

7. A conveyor for low temperature operation comprising a pair of side bars of opposed channel section with guide rails on their upper and lower flanges, a cross bar connecting the rear ends of said side bars and having a flange projecting above said top flanges, a cross head connecting the front ends of said side bars and including a cross plate bolted to the top flanges of said side bars, an end flange on the outer edge of said cross head projecting above said top flanges, a plurality of guide rods supported between said flanges on said cross bar and said cross head in spaced relation above said top flanges of said side bars, said cross plate defining longitudinally offset discharge throats at the discharge end of the conveyor, rearwardly converging tapered cams on the side guide rods located rearwardly of said cross plate, arms bracing said cams from said cross plate, a first pair of sprockets mounted on said side bars and projecting upwardly above the top flanges of said side bars, said sprockets being located in a transverse vertical plane passed through said cams, other sprockets mounted at the rear ends of said side bars and projecting upwardly above the top flanges of said side bars, loop chains of link and pin construction trained over the sprockets on each side bar with the pins guidingly engaged with said guide rails, pairs of flight plates extending between said chains with each plate connected to two adjacent pins on each chain, the trailing edge of the leading flight plate of each pair projecting substantially rearwardly behind the rearmost chain pins connected to the plate whereby the rear edge is tilted upwardly above the level of the trailing plate of the pair in rotating around said first sprockets under said cams, the trailing edge of the trailing flight plates having pusher flanges thereon, and a motor mounted on said side bars and connected to rotate said sprockets.

8. A conveyor for low temperature operation comprising a pair of side bars with opposed upper and lower flanges, a cross bar connecting the rear ends of said side bars and having a flange projecting above said upper flanges, a cross head connecting the front ends of said side bars and including a cross plate extending between the top flanges of said side bars, an end flange on the outer edge of said cross head projecting above said upper flanges, a plurality of guide rods supported between said flanges on said cross bar and said cross head in spaced relation above said upper flanges of said side bars, said cross plate defining a discharge throat at the discharge end of the conveyor, rearwardly converging tapered cams on the side guide rods located rearwardly of said cross plate, arms bracing said cams from said side bars, a first pair of sprockets mounted on said side bars and projecting upwardly above the top flanges of said side bars, said sprockets being located in a transverse vertical plane passed through said cams, other sprockets mounted at the rear ends of said side bars and projecting upwardly above the top flanges of said side bars, loop chains of link and pin construction trained over the sprockets on each side bar, pairs of flight plates extending between said chains with each plate connected to two adjacent pins on each chain, the trailing edge of the leading flight plate of each pair projecting substantially rearwardly behind the rearmost chain pins connected to the plate whereby the rear edge is tilted upwardly above the level of the trailing plate of the pair in rotating around said first sprockets under said cams, the trailing edges of the trailing flight plates having pusher flanges thereon, and a motor mounted on said side bars and connected to rotate said sprockets.

9. A conveyor for low temperature operation comprising a pair of side bars with opposed upper and lower flanges, a cross bar connecting the rear ends of said side bars, a cross hear connecting the front ends of said side bars and including a cross plate extending between the top flanges of said side bars, guide rods supported in spaced relation above said upper flanges of said side bars, said cross plate defining a discharge throat at the discharge end of the conveyor, rearwardly and laterally outwardly inclined cams on the side guide rods located rearwardly of said cross plate, a first pair of sprockets mounted on said side bars and projecting upwardly above the top flanges of said side bars, said sprockets being located in a transverse vertical plane passed through said cams, other sprockets mounted at the rear ends of said side bars and projecting upwardly above the top flanges of said side bars, loop chains of link and pin construction trained over the sprockets on each side bar, pairs of flight plates extending between said chains with each plate connected to two adjacent pins on each chain, the trailing edge of the leading flight plate of each pair projecting substantially rearwardly behind the rearmost chain pins connected to the plate whereby the rear edge is tilted upwardly above the level of the trailing plate of the pair in rotating around said first sprockets under said cams, the trailing edges of the trailing flight plates having pusher flanges thereon, and a motor mounted on said side bars and connected to rotate said sprockets.

10. A conveyor for low temperature operation comprising a pair of side bars with opposed upper and lower flanges, a cross bar connecting the rear ends of said side bars, a cross head connecting the front ends of said side bars and including a cross plate extending between the top flanges of said side bars, guide rods supported in spaced relation above said upper flanges of said side bars, said cross plate defining a discharge throat at the discharge end of the conveyor, a first pair of sprockets mounted on said side bars and projecting upwardly above the top flanges of said side bars, other sprockets mounted at the rear ends of said side bars and projecting upwardly above the top flanges of said side bars, loop chains of link and pin construction trained over the sprockets on each side bar, pairs of flight plates extending between said chains with each plate connected to two adjacent pins on each chain, the trailing edge of the leading flight plate of each pair projecting substantially rearwardly behind the rearmost chain pins connected to the plate whereby the rear edge is tilted upwardly above the level of the trailing plate of the pair in rotating around said first sprockets, the trailing edges of the trailing flight plates having pusher flanges thereon, and a motor mounted on said side bars and connected to rotate said sprockets.

11. A conveyor for low temperature operation comprising a pair of side bars with opposed upper and lower flanges, a cross bar connecting the rear ends of said side bars, a cross head connecting the front ends of said side bars and including a cross plate extending between the top flanges of said side bars, a pair of guide rods supported in spaced relation above said upper flanges of said side bars, said cross plate defining a discharge throat at the discharge end of the conveyor, rearwardly and laterally outwardly inclined cams on said guide rods located rearwardly of said throat, a first pair of sprockets mounted on said side bars with their upper edge at about the level of the top flanges of said side bars, said sprockets being located under said cams, other sprockets mounted at the rear ends of said side bars with their upper edge at about the level of the top flanges of said side bars, loop chains trained over the sprockets on each side bar and having pins projecting inwardly from the chains, pairs of flight plates extending between said chains with each plate connected to two adjacent pins on each chain, the trailing edge of the leading flight plate of each pair projecting substantially rearwardly behind the rearmost chain pins connected to the plate whereby the rear edge is tilted upwardly above the level of the trailing plate of the pair in rotating around said first sprockets under said cams, the trailing edges of the trailing flight plates having pusher flanges thereon and means connected to rotate said sprockets.

12. A conveyor for low temperture operation comprising a pair of side bars with opposed upper and lower flanges, a cross bar connecting the rear ends of said side bars, a cross head connecting the front ends of said side bars, a pair of guide rods supported in spaced relation above said upper flanges of said side bars, means defining a discharge throat at the discharge end of the conveyor, a first pair of sprockets mounted on said side bars with their upper edge at about the level of the top flanges of said side bars, other sprockets mounted at the rear ends of said side bars with their upper edge at about the level of the top flanges of said side bars, loop chains trained over the sprockets on each side bar and having pins projecting inwardly from the chains, pairs of flight plates extending between said chains with each plate connected to two adjacent pins on each chain, the trailing edge of the leading flight plate of each pair projecting substantially rearwardly behind the rearmost chain pins connected to the plate whereby the rear edge is tilted upwardly above the level of the trailing plate of the pair in rotating around said first sprockets, the trailing edges of the trailing flight plates having pusher flanges thereon, and means connected to rotate said sprockets.

13. In a conveyor for dispensing packages of frozen food from a refrigerated cabinet and having conveyor chains trained around sprockets and connected by transverse flight plates, the combination comprising means for breaking packages frozen to said plates loose from the plates comprising pins spaced along said chains and forming connections to the ends of said flight plates along spaced lines transverse to the chains whereby the plates tilt in rotating about said sprockets, trailing edges on said flight plates extending rearwardly beyond the rearmost of the line connections to the chains to be elevated above the chains as the plates tilt, other flights having article pushing projections trailing each of said plates on said chains, side guides supported above the sides of said conveyor, and laterally and rearwardly inclined cam surfaces on said side guides located over the down turning portion of said conveyor to cam packages laterally on said plates as the plates tilt.

14. In a conveyor for dispensing packages of frozen food from a refrigerated cabinet and having conveyor chains trained around sprockets and connected by transverse flight plates, the combination comprising means for breaking packages frozen to said plates loose from the plates comprising means forming connections to the ends of said flight plates along spaced lines transverse to the chains whereby the plates tilt in rotating about said sprockets, trailing edges on said flight plates extending rearwardly beyond the rearmost of the line connections to the chains to be elevated above the chains as the plates tilt, other flights having article pushing projections trailing each of said plates on said chains, side guides supported above the sides of said conveyor, and laterally and rearwardly inclined cam surfaces located over the down turning portion of said conveyor to cam packages laterally on said plates as the plates tilt.

15. In a conveyor for dispensing packages of frozen food from a refrigerated cabinet and having conveyor chains trained around sprockets and connected by transverse flight plates, the combination comprising means for breaking packages frozen to said plates loose from the plates comprising pins spaced along said chains and forming connections to the ends of said flight plates along spaced lines transverse to the chains whereby the plates tilt in rotating about said sprockets, trailing edges on said flight plates extending rearwardly beyond the rearmost of the line connections to the chains to be elevated above the chains as the plates tilt, other flights having article pushing projections trailing each of said plates on said chains, side guides supported above the sides of said conveyor, laterally and rearwardly inclined cam surfaces on said side guides located over the down turning portion of said conveyor to cam packages laterally on said plates as the plates tilt, and a cross member extending rigidly across said conveyor just in front of the downturning position of said flights to receive and support packages delivered from said conveyor.

16. In a conveyor for dispensing packages of frozen food from a refrigerated cabinet and having conveyor chains trained around sprockets and connected by transverse flight plates, the combination comprising means for breaking packages frozen to said plates loose from the plates comprising pins spaced along said chains and forming connections to the ends of said flight plates along spaced lines transverse to the chains whereby the plates tilt in rotating about said sprockets, trailing edges on said flight plates extending rearwardly beyond the rearmost of the line connections to the chains to be elevated above the chains as the plates tilt, other flights having article pushing projections trailing each of said plates on said chains, side guides supported above the sides of said conveyor, and a cross member extending rigidly across said conveyor just in front of the downturning position of said flights to receive and support packages delivered from said conveyor.

17. In a conveyor for dispensing packages of frozen food from a refrigerated cabinet and having conveyor chains trained around sprockets and connected by transverse flight plates, the combination comprising means for breaking packages frozen to said plates loose from the plates comprising means forming connections to the ends of said flight plates along spaced lines transverse to the chains whereby the plates tilt in rotating about said sprockets, trailing edges on said flight plates extending rearwardly beyond the rearmost of the line connections to the chains to be elevated above the chains as the plates tilt, other flights having article pushing projections trailing each of said plates on said chains, side guides supported above the sides of said conveyor, laterally and rearwardly inclined cam surfaces located over the downturning portion of said conveyor to cam packages laterally on said plates as the plates tilt, and a cross member extending rigidly across said conveyor just in front of the downturning position of said flights to receive and support packages delivered from said conveyor.

18. In a conveyor for dispensing packages of frozen food from a refrigerated cabinet and having conveyor chains trained around sprockets and connected by transverse flight plates, the combination comprising means for breaking packages frozen to said plates loose from the plates comprising means forming connections to the ends of said flight plates along spaced lines transverse to the chains whereby the plates tilt in rotating about said sprockets, trailing edges on said flight plates extending rearwardly beyond the rearmost of the line connections to the chains to be elevated above the chains as the plates tilt, other flights having article pushing projections trailing each of said plates on said chains, side guides supported above the sides of said conveyor, and a cross member extending rigidly across said conveyor just in front of the downturning position of said flights to receive and support packages delivered from said conveyor.

19. In a conveyor for dispensing packages of frozen food from a refrigerated cabinet and having conveyor chains trained around sprockets and connected by transverse flight plates, the combination comprising means for breaking packages frozen to said plates loose from the plates comprising means forming connections to the ends of said flight plates along spaced lines transverse to the chains whereby the plates tilt in rotating about said sprockets, other flights having article pushing projections trailing each of said plates on said chains, and trailing edges on said flight plates extending rearwardly beyond the rearmost of the line connections to the chains to be elevated above the chains as the plates tilt.

References Cited in the file of this patent

UNITED STATES PATENTS

| | | |
|---|---|---|
| 1,850,364 | Vaughn | Mar. 22, 1932 |
| 1,949,040 | Clausen | Feb. 27, 1934 |
| 2,561,828 | Springsteen | July 24, 1951 |
| 2,661,091 | Maloney | Dec. 1, 1953 |